(12) United States Patent
Woo

(10) Patent No.: US 11,851,075 B2
(45) Date of Patent: Dec. 26, 2023

(54) ELECTRONIC DEVICE AND CONTROL METHOD THEREFOR

(71) Applicant: SAMSUNG ELECTRONICS CO., LTD., Suwon-si (KR)

(72) Inventor: Sangjung Woo, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 249 days.

(21) Appl. No.: 17/285,396

(22) PCT Filed: Dec. 26, 2019

(86) PCT No.: PCT/KR2019/018463
§ 371 (c)(1),
(2) Date: Apr. 14, 2021

(87) PCT Pub. No.: WO2020/138950
PCT Pub. Date: Jul. 2, 2020

(65) Prior Publication Data
US 2022/0063644 A1  Mar. 3, 2022

(30) Foreign Application Priority Data
Dec. 27, 2018  (KR) .................. 10-2018-0170248

(51) Int. Cl.
  B60W 50/02  (2012.01)
  B60W 60/00  (2020.01)
(52) U.S. Cl.
  CPC ...... *B60W 50/0225* (2013.01); *B60W 60/001* (2020.02); *B60W 2420/40* (2013.01);
  (Continued)
(58) Field of Classification Search
  CPC ......... B60W 50/0225; B60W 50/0205; B60W 2050/0215; B60W 2050/065;
  (Continued)

(56) References Cited

U.S. PATENT DOCUMENTS 6,760,863 B1 * 7/2004 Kagami ............... G05B 19/052
  714/16
7,562,252 B2   7/2009 Arai
  (Continued)

FOREIGN PATENT DOCUMENTS

CN  103661378 A  3/2014
CN  106864462 A  6/2017
  (Continued)

OTHER PUBLICATIONS

International Search Report dated Apr. 20, 2020 issued by the International Searching Authority in counterpart International Application No. PCT/KR2019/018463 (PCT/ISA/210).
  (Continued)

*Primary Examiner* — Russell Frejd
*Assistant Examiner* — Brandon Z Willis
(74) *Attorney, Agent, or Firm* — Sughrue Mion, PLLC

(57) ABSTRACT

An electronic device is disclosed. The electronic device comprises a communication interface, a memory in which a program for performing an autonomous driving function is stored, and a processor which performs second processing for first processed data on the basis of a first program stored in the memory, when the first processed data is received from an external sensor device through the communication interface, and which performs, on the basis of a second program stored in the memory, first processing for raw data received from the external sensor device, and then performs the second processing on the basis of the first program, when the occurrence of an error in the reception of the data is identified.

19 Claims, 11 Drawing Sheets

(52) U.S. Cl.
CPC ..... *B60W 2420/42* (2013.01); *B60W 2420/52* (2013.01); *B60W 2554/404* (2020.02); *B60W 2556/00* (2020.02)

(58) Field of Classification Search
CPC ............... B60W 60/001; B60W 40/02; B60W 2420/40; B60W 2420/42; B60W 2420/403; B60W 2420/52; B60W 2554/404; B60W 2556/00; B60W 2556/45; B60W 2050/0002; B60W 2050/0005
See application file for complete search history.

(56) References Cited

U.S. PATENT DOCUMENTS

| | | | |
|---|---|---|---|
| 9,090,265 | B2 | 7/2015 | Yousuf |
| 9,096,228 | B2 * | 8/2015 | Stahlin .................. G06V 20/58 |
| 9,393,958 | B2 | 7/2016 | Stahlin et al. |
| 9,454,150 | B2 | 9/2016 | Uehara |
| 9,731,729 | B2 * | 8/2017 | Solyom ................ B60W 10/20 |
| 10,026,239 | B2 | 7/2018 | Kim et al. |
| 10,042,693 | B2 | 8/2018 | Zettler et al. |
| 10,250,842 | B2 | 4/2019 | Park et al. |
| 11,327,486 | B2 * | 5/2022 | Park ................ B60W 60/00186 |
| 2013/0090803 | A1 | 4/2013 | Stahlin et al. |
| 2013/0158852 | A1 | 6/2013 | Stahlin et al. |
| 2014/0067192 | A1 | 3/2014 | Yousuf |
| 2014/0351658 | A1 | 11/2014 | D'Ambrosio |
| 2015/0025731 | A1 | 1/2015 | Uehara |
| 2015/0355224 | A1 | 12/2015 | Greer |
| 2017/0080950 | A1 | 3/2017 | Pink et al. |
| 2017/0169627 | A1 | 6/2017 | Kim et al. |
| 2017/0187981 | A1 | 6/2017 | Park et al. |
| 2018/0046182 | A1 | 2/2018 | Joyce et al. |
| 2018/0063361 | A1 | 3/2018 | Goo et al. |
| 2018/0068206 | A1 | 3/2018 | Pollach et al. |
| 2018/0097996 | A1 | 4/2018 | Kuehnle et al. |
| 2018/0261020 | A1 | 9/2018 | Petousis et al. |
| 2020/0148201 | A1 * | 5/2020 | King .................. B60W 50/0205 |
| 2020/0331493 | A1 * | 10/2020 | Wu .................... B60W 60/0015 |

FOREIGN PATENT DOCUMENTS

| | | |
|---|---|---|
| CN | 107786794 A | 3/2018 |
| CN | 108196547 A | 6/2018 |
| DE | 10 2013 220 526 A1 | 4/2015 |
| EP | 3 159 853 A1 | 4/2017 |
| JP | 201520742 A | 2/2015 |
| JP | 2016-97748 A | 5/2016 |
| JP | 2017175403 A | 9/2017 |
| JP | 2018-183947 A | 11/2018 |
| KR | 10-0376924 B1 | 3/2003 |
| KR | 10-1242407 B1 | 3/2013 |
| KR | 1020170076482 A | 7/2017 |
| KR | 10-1820538 B1 | 1/2018 |
| KR | 10-2018-0058090 A | 5/2018 |
| KR | 1020180053073 A | 5/2018 |
| KR | 1020180070258 A | 6/2018 |
| KR | 101860966 B1 | 7/2018 |

OTHER PUBLICATIONS

International Written Opinion dated Apr. 20, 2020 issued by the International Searching Authority in counterpart International Application No. PCT/KR2019/018463 (PCT/ISA/237).

Communication dated Oct. 13, 2021 issued by the European Intellectual Property Office in counterpart European Application No. 19903935.5.

Notice of Allowance (dated Nov. 17, 2022) issued by the Korean Patent Office for Korean Patent Application No. 10-2018-0170248.

Communication dated Jun. 19, 2023 by the Chinese Patent Office for CN Patent Application No. 201980079926.5.

* cited by examiner

ELECTRONIC DEVICE AND CONTROL METHOD THEREFOR

TECHNICAL FIELD

The disclosure relates to an electronic apparatus that performs an autonomous driving function based on sensing data and a method for controlling thereof.

BACKGROUND ART

Autonomous vehicles perform an autonomous driving function through various sensors provided in the vehicles. Meanwhile, recently, a technology that transmits data that the sensor has performed up to a pre-processing process, such as object detection is used instead of receiving raw data obtained from a sensor.

However, when the pre-processing process is not normally performed because the sensor does not operate normally, there has been a problem in vehicle safety such as termination of the autonomous driving function or sudden braking of the vehicle.

Therefore, even if there is a problem in the calculation of the sensor, it has been required to perform the autonomous driving function.

DETAILED DESCRIPTION OF THE INVENTION

Technical Problem

The disclosure is in accordance with the necessity described above, and an object of the disclosure is to provide an electronic apparatus that perform an autonomous driving function based on raw data obtained from a sensor even if there is a problem in the computing capability of the sensor.

Technical Solution

According to an embodiment of the disclosure, an electronic apparatus includes a communication interface, a memory in which a program for performing an autonomous driving function is stored, and a processor configured to, based on a first processed data being received from an external sensor device through the communication interface, perform second processing for the received data based on a first program stored in the memory, and based on the occurrence of an error in the reception of the data being identified, perform, based on a second program stored in the memory, first processing for raw data received from the external sensor device, and then perform second processing based on the first program.

The sensor device may be a camera device, and wherein the first processed data is data processed by at least one of object detection and scene segmentation in an image acquired through the camera device.

The second processing may be configured to include a processing using data received from a plurality of external devices including the sensor device.

The second processing may be configured to include at least one of planning processing, live mapping processing, object tracking processing, lane detection processing or control processing, for performing the autonomous driving function.

The processor may be configured to, based on the first processed data being not received within a threshold time through the communication interface, identify there is the occurrence of an error in the reception of the first processed data.

The processor may be configured to identify whether an error occurs in the reception of the first processed data by periodically monitoring the reception of the first processed data.

The processor may be configured to, based on the occurrence of an error in the reception of the first processed data being identified through the communication interface, request a transmission of the raw data from the sensor device.

The sensor device may be configured to include at least one of a camera device, a light detection and ranging (Lidar) device, a radio detection and ranging (Radar) device or an infra-red (IR) device.

The first processed data may be configured to be received through a first communication channel, and wherein the raw data is configured to be received through a second communication channel.

The processor may be configured to, based on the occurrence of an error in the reception of the first processed data being identified, perform the first processing for the raw data by loading the second program stored in the memory.

According to an embodiment of the disclosure, a method for controlling an electronic apparatus in which a program for performing an autonomous driving function is stored, the method includes, based on a first processed data being received from an external sensor device, performing second processing for the received data based on a stored first program, identifying the occurrence of an error in the reception of the data, and based on the occurrence of an error in the reception of the data being identified, performing, based on a stored second program, first processing for raw data received from the external sensor device, and then performing second processing based on the first program.

The sensor device may be a camera device, and wherein the first processed data is data processed by at least one of object detection and scene segmentation in an image acquired through the camera device.

The second processing may be configured to include a processing using data received from a plurality of external devices including the sensor device.

The second processing may be configured to include at least one of planning processing, live mapping processing, object tracking processing, lane detection processing or control processing, for performing the autonomous driving function.

The identifying the occurrence of an error may include, based on the first processed data being not received within a threshold time through the communication interface, identifying there is the occurrence of an error in the reception of the first processed data.

The identifying the occurrence of an error may be configured to identify whether an error occurs in the reception of the first processed data by periodically monitoring the reception of the first processed data.

The identifying the occurrence of an error may be configured to, based on the occurrence of an error in the reception of the first processed data being identified, request a transmission of the raw data from the sensor device.

The sensor device may be configured to include at least one of a camera device, a light detection and ranging (Lidar) device, a radio detection and ranging (Radar) device or an infra-red (IR) device.

The first processed data may be configured to be received through a first communication channel, and wherein the raw data is configured to be received through a second communication channel.

The identifying the occurrence of an error may be configured to, based on the occurrence of an error in the reception of the first processed data being identified, perform the first processing for the raw data by loading the second program.

Effect of the Invention

As described above, according to various embodiments of the disclosure, even if the electronic apparatus does not receive processed (computed) data from a sensor, it may directly perform processing based on raw data to perform an autonomous driving function.

Accordingly, the problems such as sudden termination of the autonomous driving function or sudden braking of the vehicle due to a failure of the electronic apparatus to receive processed (calculated) data from the sensor may be solved.

BEST MODE FOR IMPLEMENTING THE DISCLOSURE

Mode for Implementing the Disclosure

Figure 1:
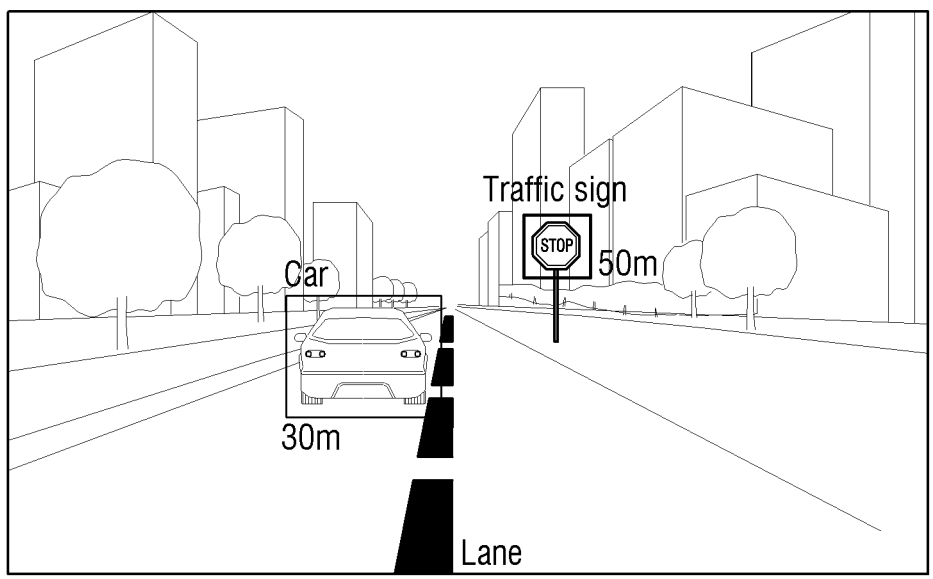
FIG. 1 is a view illustrating an electronic apparatus obtaining a live map through surrounding images including various objects to help understanding of the disclosure.

Hereinafter, the disclosure will be described in detail with reference to the accompanying drawings.

The terms used in example embodiments will be briefly explained, and example embodiments will be described in greater detail with reference to the accompanying drawings.

Terms used in the disclosure are selected as general terminologies currently widely used in consideration of the configuration and functions of the disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The example embodiments may vary, and may be provided in different example embodiments. Various example embodiments will be described with reference to accompanying drawings. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the disclosure, the specific description is omitted.

Singular forms are intended to include plural forms unless the context clearly indicates otherwise. In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

The term "at least one of A or/and B" means (1) including at least one A, (2) including at least one B, or (3) including both at least one A and at least one B.

The expression "1", "2", "first", or "second" as used herein may modify a variety of elements, irrespective of order and/or importance thereof, and only to distinguish one element from another. Accordingly, without limiting the corresponding elements.

If it is described that a certain element (e.g., first element) is "operatively or communicatively coupled with/to" or is "connected to" another element (e.g., second element), it should be understood that the certain element may be connected to the other element directly or through still another element (e.g., third element).

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware. Also, the term "user" may refer to a person who uses an electronic apparatus or an apparatus (e.g., an artificial intelligence (AI) electronic apparatus) that uses the electronic apparatus.

The example embodiments of the disclosure will be described in greater detail below in a manner that will be understood by one of ordinary skill in the art. However, exemplary embodiments may be realized in a variety of different configurations, and not limited to descriptions provided herein. Also, well-known functions or constructions are not described in detail since they would obscure the invention with unnecessary detail.

Hereinafter, exemplary embodiments will be described in greater detail with reference to the accompanying drawings.

FIG. 1 is a view illustrating an electronic apparatus obtaining a live map through surrounding images including various objects to help understanding of the disclosure.

The electronic apparatus 100 according to an embodiment of the disclosure is a driving assistance device mounted on a vehicle, and is a device that enables autonomous driving of the vehicle. Specifically, the electronic apparatus 100 is a device that implements advanced driver assistance systems (ADAS), and may be implemented as an electrical system of a vehicle, a rearview mirror integrated module, and a portable device such as a black box that detachable to a vehicle, a mobile phone, PDA or the like.

Meanwhile, the electronic apparatus 100 may obtain a live map based on data received from a sensor device 200 and perform autonomous driving of a vehicle based on a live map. The live map may be a map around the vehicle that is updated in real time. The live map may include an object type, a distance to an object, a lane, a traffic sign, or the like, but is not limited thereto.

The sensor device 200 is a device that senses information on surrounding circumstances, road conditions, or the like. The sensor device 200 may include a camera device, Lidar device, Radar device, or IR. Meanwhile, the sensor device 200 may simply transmit the data obtained by the sensor device 200 to the electronic apparatus 100, but directly process the obtained data and transmit the processed data to the electronic apparatus 100. For example, the camera device may include a dedicated chip capable of performing some data processing necessary for an autonomous driving function, and may perform data processing using the chip. For example, data including information on an object detected by photographing a surrounding image and performing object detection processing from the photographed image, that is, processed data, may be transmitted to the electronic apparatus 100. In this case, the amount of computation of the electronic apparatus 100 may be reduced. However, if the electronic apparatus 100 fails to normally receive processed data, such as an error (e.g., a hardware error of a dedicated chip) occurring in the camera device, a problem may occur in the autonomous driving function of the electronic apparatus 100.

Accordingly, in the disclosure, various embodiments in which the electronic apparatus 100 can normally perform an autonomous driving function even when the electronic apparatus 100 does not normally receive processed data will be described below in detail.

Figure 2:
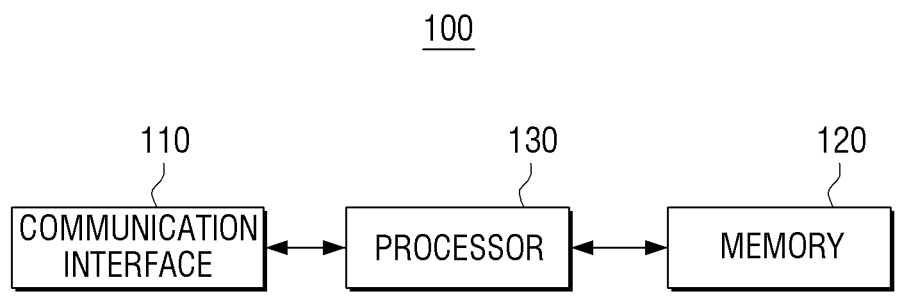
FIG. 2 is a block diagram illustrating an operation of an electronic apparatus according to an embodiment.

FIG. 2 is a block diagram illustrating an operation of an electronic apparatus according to an embodiment.

Referring to FIG. 2, the electronic apparatus 100 includes a communication interface 110, a memory 120 and a processor 130.

The communication interface 110 may perform transmission and reception of data with the external sensor device 200.

For example, the communication interface 110 is a component capable of transmitting data to the external sensor device 200 according to a wired/wireless communication method. For example, the communication interface 110 may use Bluetooth (BT), Wireless Fidelity (WI-FI), Zigbee, Infrared (IR), Ethernet, Serial Interface, Universal Serial Bus (USB), mobile industry processor interface camera device serial interface (MIPI CSI), near field communication (NFC), vehicle to everything (V2X), mobile communication (Cellular), or the like.

Specifically, the communication interface 110 may receive one of the processed data or raw data from the external sensor device 200. This will be described in detail below.

The memory 120 may store a program for performing an autonomous driving function. Also, the memory 120 may store a program for performing other functions of the electronic apparatus 110.

Programs for performing autonomous driving functions may include at least one of object tracking, planning, visualization, control, lane detection, live mapping, object detection, or scene segmentation.

A program for performing other functions of the electronic apparatus 100 may include at least one of a deep learning framework, vision, multimedia, and graphics. Here, the deep learning framework is a program in which a first learning network to be described later is used, and the vision is a program related to a field of view of a vehicle, and an image photographed by an internal or external camera device is used. In addition, the multimedia is a program related to content output through at least one of a display (not shown) or a speaker (not shown), and the graphic is a program related to content displayed through the display.

The memory 120 may be implemented as a memory separate from the processor 130. In this case, the memory 120 may be implemented in the form of a memory embedded in the electronic apparatus 100 according to the purpose of storing data, or may be implemented in a form of a memory that is detachable to the electronic apparatus 100. For example, data for driving the electronic apparatus 100 may be stored in a memory embedded in the electronic apparatus 100, and data for expanding function of the electronic apparatus 100 may be stored in a memory detachable to the electronic apparatus 100. Meanwhile, the memory embedded in the electronic apparatus 100 may be implemented as at least one of a volatile memory (e.g., dynamic RAM (DRAM), static RAM (SRAM), or synchronous dynamic RAM (SDRAM)), a non-volatile memory (e.g., one time programmable ROM (OTPROM)), programmable ROM (PROM), erasable and programmable ROM (EPROM), electrically erasable and programmable ROM (EEPROM), mask ROM, flash ROM, flash memory (e.g. NAND flash or NOR flash, etc.), a hard drive, or a solid state drive (SSD), and the memory that is detachable to the electronic apparatus 100 may be implemented as a memory card (e.g., compact flash (CF), secure digital (SD), micro secure digital (Micro-SD), mini secure digital (Mini-SD), extreme digital (xD), multi-media card (MMC), etc.), external memory that can be connected to a USB port (e.g., USB memory) or the like.

In addition, the memory 120 may be implemented as an internal memory such as a ROM (e.g., an electrically erasable programmable read-only memory (EEPROM)), a RAM included in the processor 130, or the like.

Meanwhile, a case in which a program for performing an autonomous driving function is stored in a memory provided in the electronic apparatus 10 is described in the above-described embodiment, but may be stored in an external server according to another embodiment. In this case, the electronic apparatus 100 may also receive and use the corresponding program.

The processor 130 controls the overall operation of the electronic apparatus 100.

According to an embodiment of the disclosure, the processor 130 may be implemented as a digital signal processor (DSP), a microprocessor, or a time controller (TCON) that processes digital signals, but is not limited thereto, and may include one or more of a central processing unit (CPU), a micro controller unit (MCU), a micro processing unit (MPU), a controller, an application processor (AP), or a communication processor (CP), and ARM processor, and may be defined in the corresponding term. In addition, the processor 130 may be included in a system on chip (SoC) with a built-in processing algorithm, a large scale integration (LSI) or may be implemented in the form of a field programmable gate array (FPGA). The processor 130 may perform various functions by executing computer executable instructions stored in the memory 120. In addition, the processor 130 may include a graphics processing unit (GPU) and a numeric processing unit (NPU).

According to an embodiment of the disclosure, the processor 130 may receive first processed data from the sensor device 200 through the communication interface 110.

The first processing corresponds to a pre-processing operation for performing autonomous driving of the vehicle, and may be, for example, at least one of object detection and scene segmentation. The object detection is a function of detecting an object from raw data, and may identify an object type or the like. The scene segmentation is a function of segmenting a scene from raw data. However, the disclosure is not limited thereto, and other processing operations that may be performed by the sensor device 200 (or a dedicated chip provided in the sensor device 200) may be included in the first processing.

The first processed data may be data obtained after the raw data obtained from the sensor device 200 is second processed. For example, when the sensor device 200 is implemented as a camera device, the first processed data may be data obtained after at least one of object detection or scene segmentation in an image (raw data) obtained through the camera device is processed. For example, it may be at least one of data including object information or data including scene segmentation information.

In other words, when object detection-processed data is received, the processor 130 may identify a location of the object existing around the vehicle, a type of the object, or the like based on the received data without performing separate object detection. Accordingly, the amount of computation of the processor 130 may be reduced, such that quality of service (QoS) may be guaranteed. Meanwhile, an example of the above-described first processed data will be described with reference to FIG. 10.

Figure 10:
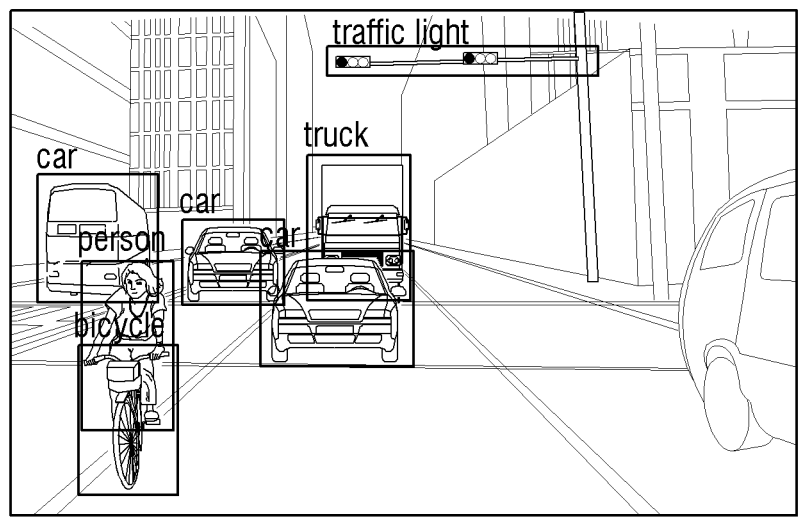
FIG. 10 is a view illustrating first processed data according to an embodiment.

FIG. 10 is a view illustrating a display system 1000 according to an embodiment of the disclosure.

It is assumed that the sensor device 200 is a camera device and the first processing performed is object detection. The camera device may obtain a photographed image (raw data) and perform object detection processing (first processing) based on the photographed image.

As illustrated in FIG. 10, the camera device may perform object detection processing to obtain information on the identified object, such as location and type information of the object included in the photographed image. For example, the camera device may identify cars, bicycles, people, or traffic sings from the photographed image.

Thereafter, the camera device may transmit data including object detection processing, that is, object information to the electronic apparatus 100.

Referring back to FIG. 2, according to another embodiment, when an error occurs in data reception from the sensor device 200, the processor 130 may directly perform the first processing, which will be described in detail below.

Meanwhile, when the first processed data is received from the sensor device 200 through the communication interface 110, the processor 130 may perform second processing the first processed data based on a first program stored in the memory 120. The first program means a program required to perform the second processing. In addition, the second processing corresponds to a post-processing operation for the electronic apparatus 100 to perform autonomous driving of the vehicle based on the first processed data, and may include, for example, planning processing, live mapping, object tracking processing, lane detection processing, or control processing. For example, the processor 130 may perform a live mapping process (second processing) based on the object detected according to the object detection process (first processing). Here, the planning processing is a function of generating steering angles and accelerations for longitudinal and lateral control, and the live mapping is a function of mapping a type of the identified object, a distance to the object, surrounding road circumstances, or the like on a map in real time, the object tracking is a function of tracking the same object as an object of a previous frame by comparing a location of the object in a plurality of frames. In addition, the lane detection is a function of identifying a lane, a type of lane, a direction of a lane, or the like, and the control is a function of controlling an autonomous driving function based on the identified surrounding road circumstances.

Meanwhile, as described above, the second processing may include processing using data received from a plurality of external devices including the sensor device 200. In other words, the second processing may be a processing that must be performed in the electronic apparatus 100 because not only data received from the sensor device 200 but also data received from other sensor devices must be used. However, the disclosure is not limited thereto, and, the second processing may correspond to a case where only data received from the sensor device 200 is used or a processing that is possible in a dedicated chip provided in the sensor device 200 according to an implementation example.

In some cases, it may be a process using the first processed data from a device other than the sensor device 200. For example, there may be a separate external device (not shown) that performs first processing raw data obtained by the sensor device 200. For example, a dedicated chip that processes only raw data of the sensor device 200 may exist separately. In this case, when the first processed data is received from an external device (e.g., dedicated chip) other than the sensor device 200, the processor 130 may perform second processing the data received based on the first program. However, hereinafter, for convenience of description, the processor 130 will be described as receiving the first processed data from the sensor device 200.

Meanwhile, in some cases, object tracking processing, lane detection processing, or the like may be included in the first processing. However, planning processing, live mapping processing, and control processing are operations to be performed based on the first processed data, and must be second processed by the processor 130.

Meanwhile, when it is identified that there is the occurrence of an error in the reception of data, the processor 130 may perform first processing the raw data received from the sensor device 200 based on the second program stored in the memory 120. The error in the reception of data may include a case in which the electronic apparatus 100 fails to receive data or the electronic apparatus 100 receives data but receives data including an error.

Specifically, when the first data processed through the communication interface 110 is not received within a threshold time, the processor 130 may identify that an error has occurred in receiving the first processed data. For example, when the threshold time is 0.1 seconds, and if the first processed data is not received within 0.1 seconds after receiving the first processed data, the processor 130 may identify that there is an occurrence of an error in the reception of the first processed data.

Also, the processor 130 may periodically monitor reception of the first processed data to identify whether an error occurs in reception of the first processed data. For example, the processor 130 may monitor whether or not the first processed data is received every 0.1 seconds, and if it is identified that the first processed data has not been received, it is identified that an error has occurred in the reception of the first processed data.

Also, when data is received from the sensor device 200, but the received data is data that has not been first processed, the processor 130 may identify that there is the occurrence of an error in the reception of the first processed data.

Meanwhile, when it is identified that there is the occurrence of an error in the reception of the first processed data through the communication interface 110, the processor 130 may request the sensor device 200 to transmit raw data. For example, it is assumed the camera device included in the sensor device 200 can normally obtain an image (raw data) around the vehicle, but when a processor (not shown) of the camera device that performs object detection based on the obtained image cannot be performed, that is, the first processing cannot be performed. In this case, the processor 130 may request the sensor device 200 to transmit raw data, and the camera device may transmit the obtained image (raw data) to the electronic apparatus 100 according to the request. However, even if there is no request for transmission from the processor 130, the sensor device 200 may transmit the raw data to the electronic apparatus 100 when it is identified that there is the occurrence of an error in the transmission of the first processed data.

The processor 130 may perform first processing the raw data received from the sensor device 200 based on a second program stored in the memory 120 to perform second processing based on the first program. In other words, the processor 130 may directly perform the first processing performed by the sensor device 200. The second program is a program loaded from the memory 120 to perform the first processing.

For example, when a photographed image (raw data) is received from the camera device, the processor 130 may perform object detection processing from the photographed image based on the second program. Thereafter, the processor 130 may perform the second processing based on the result of the object detection processing. For example, the processor 130 may perform live mapping processing to display location and type information of the object according to object detection processing on a live map.

Meanwhile, the processor 130 may perform at least one of a first processing or a second processing through a first learning network model based on deep learning. For example, the first learning network model may learn and update a criterion for estimating an object included in an image by using a plurality of frames including consecutive objects as learning data. Accordingly, the first learning network model may perform object tracking processing (second processing) on object detection-processed data (first processed data).

Meanwhile, it has been described above that when it is identified that there is the occurrence of an error in the reception of data, the raw data is received by the electronic apparatus 100 from the sensor device 200. However, in some cases, the electronic apparatus 100 may receive periodically raw data from the sensor device 200.

Figure 3:
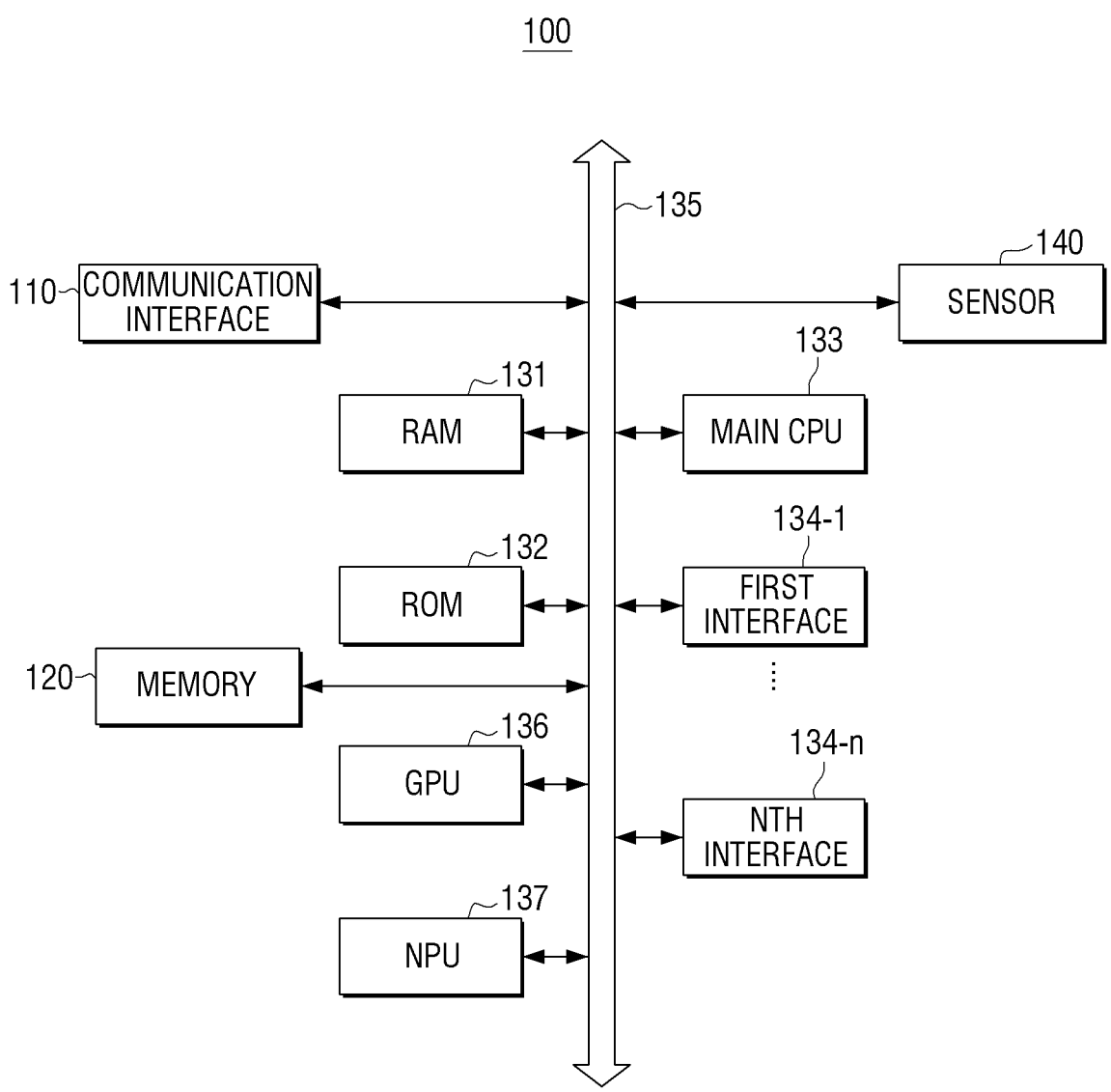
FIG. 3 is a block diagram illustrating a detailed configuration of an electronic apparatus.

FIG. 3 is a block diagram illustrating a detailed configuration of an electronic apparatus.

Referring to FIG. 3, the electronic apparatus 100 includes a communication interface 110, a memory 120, a processor 130, and a sensor 140. A detailed description of configurations illustrated in FIG. 3 that overlap the configuration illustrated in FIG. 2 will be omitted.

The communication interface 110 is a component capable of transmitting and receiving data to and from the sensor device 200. The communication interface 110 may include a Wi-Fi module (not shown), a Bluetooth module (not shown), a local area network (LAN) module, and a wireless communication module (not shown). Here, each communication module may be implemented in the form of at least one hardware chip. In addition to the communication methods described above, the wireless communication module may include at least one communication chip that performs communication according to various wireless communication modules such as Zigbee, ethernet, universal serial bus (USB), mobile industry processor interface camera device serial interface (MIPI), 3rd Generation (3G), and 3rd generation partnership project (3GPP).), long term evolution (LTE), LTE Advanced (LTE-A), 4th Generation (4G), 5th Generation (5G), or the like. However, this is only an exemplary embodiment, and when the communication interface 110 communicates with the sensor device 200, at least one communication module among various communication modules may be used. In addition, the communication interface 110 may transmit and receive data to and from the sensor device 200 through wired communication.

Further, the communication interface 110 may receive first processed data through a first communication channel and raw data through a second communication channel. When a wired communication method between the electronic apparatus 100 and the sensor device 200 is used, the first communication channel and the second communication channel may be implemented with different cables. Alternatively, when a wireless communication method between the electronic apparatus 100 and the sensor device 200 is used, the first communication channel and the second communication channel may use different communication channels. However, the disclosure is not limited thereto, and the first communication channel and the second communication channel may be the same channel.

The processor 130 controls the overall operations of the electronic apparatus 100 using various programs stored in the storage 120.

Specifically, the processor 130 includes a random access memory (RAM) 131, a read only memory (ROM) 132, a main central processing unit (CPU) 133, first through nth interfaces 134-1 through 134-n, and a bus 135.

The RAM 131, the ROM 132, the main CPU 133, the first through nth interfaces 134-1 through 134-n, etc. may be connected to one another through the bus 135.

The ROM 132 may store a set of commands for system booting. If a turn-on command is input and the power is supplied, the CPU 133 copies the 0/S stored in the memory 120 into the RAM 131 according to the command stored in the ROM 132, and boots the system by executing the 0/S. In response to the booting being completed, the main CPU 133 may copy various application programs stored in the memory 120 to the RAM 131, and execute the application programs copied to the RAM 131 to perform various operations. However, RAM 131 and ROM 132 described above may be implemented as external memories separate from the processor 130.

The main CPU 133 accesses the memory 120 to perform booting using the OS stored in the memory 120. The CPU 1013 may perform various operations by using the various programs, contents, data, and the like stored in the memory 120. In particular, according to an embodiment, the main CPU 133 may copy the first and second programs stored in the memory 120 to the RAM 131 according to the instruction stored in the ROM 132 and access the RAM 131 to execute first and second programs.

The first to n-th interfaces 134-1 to 134-*n* may be connected with various components described above. One of the interfaces may be network interface which is connected to an external apparatus via a network.

The GPU 136 may correspond to a high-performance processing device for graphic processing, and may be a specialized electronic circuit designed to accelerate the generation of an image in a frame buffer to be output to a screen by rapidly processing and changing the memory 120. In addition, the GPU 136 may refer to a visual processing unit (VPU).

The NPU 137 may correspond to an AI chipset (or AI processor) and may be an AI accelerator. The NPU 137 may correspond to a processor chip optimized for performing a deep neural network. Meanwhile, the NPU 137 may correspond to a processing unit that executes a deep learning model on behalf of the GPU 136, and the NPU 137 may correspond to a processing unit that executes a deep learning model together with the GPU 136.

Meanwhile, in FIG. 3, all of the main CPU 133, GPU 136, and NPU 137 are shown, but the processor 130 may be implemented and operated as one of at least one of the main CPU 133, the GPU 136, or the NPU 137.

The sensor 140 is a component for sensing the surroundings of a vehicle. Some of the camera device, Lidar device, Radar device, and IR device of the sensor device 200 described above may be provided inside the electronic apparatus 100.

Figure 4:
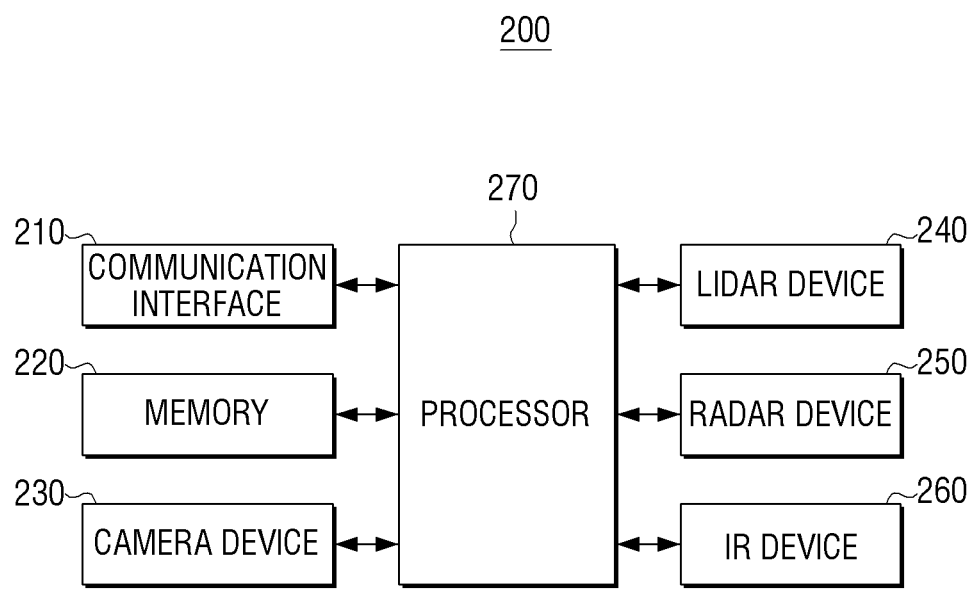
FIG. 4 is a block diagram illustrating a detailed configuration of a sensor device.

FIG. 4 is a block diagram illustrating a detailed configuration of a sensor device.

Referring to FIG. 4, the sensor device 200 includes a communication interface 210, a memory 220, a camera device 230, a Lidar device 240, a Radar device 250, an IR device 260, and a processor 270. A detailed description of configurations illustrated in FIG. 4 that overlaps with the configuration illustrated in FIG. 3 will be omitted.

The communication interface 210 is a component capable of transmitting and receiving data to and from the electronic apparatus 100. The communication interface 210 may transmit the first processed data or raw data by the processor 270 to the electronic apparatus 100.

The memory 220 may store raw data obtained through the camera device 230, the Lidar device 240, the Radar device 250, and the IR device 260. For example, the memory 220 may store image data photographed through the camera device 230.

Also, the memory 220 may store data first processed by the processor 270.

The camera device 230 may photograph an image around the vehicle. For example, objects, lanes, traffic signs, or the like located around the vehicle may be photographed through the camera device 230. The camera device 230 may be implemented as a single camera device or a plurality of camera devices. For example, the camera device 230 may be disposed in front and rear of the vehicle.

A light detection and ranging (LIDAR) device 240 may be a sensor capable of detecting the surrounding circumstances, such as a shape of the object, a distance to the object, or the like using reflected light that fires a laser and returns from the surrounding object. The Lidar device 240 may generate a 3D image of the surrounding area by using the reflected light.

The radio detection and ranging (RADAR) device 250 may detect a location of the object, a velocity and/or a direction of the object by emitting an electromagnetic wave and using an echo wave reflected and returned from a surrounding object. In other words, the Radar device 250 may be a sensor configured to detect an object in a circumstance in which a vehicle is located using a wireless signal. A wavelength of the electromagnetic wave used by the Radar device 250 may vary depending on its purpose. For example, if a low-frequency electromagnetic wave with a long wavelength is used, a detecting distance is increased due to low attenuation, but a resolution may be lowered since it may be difficult to identify an object smaller than the wavelength. On the other hand, if a high frequency with a short wavelength is used, the resolution increases, but attenuation may occur due to absorption or scattering by moisture, clouds, air, or the like.

the infra-red (IR) 260 is a device capable of detecting an object by measuring temperature or the like using infrared rays.

The processor 270 controls the overall operation of the sensor device 200.

The processor 270 may perform a first processing based on the raw data obtained from at least one of the camera device 230, the Lidar device 240, the Radar device 250, and the IR device 260. For example, the processor 270 may perform at least one of the object detection processing or the scene segmentation processing based on the raw data, and transmit the first processed data to the device 100 through the communication interface 210. For example, the processor 270 may perform object detection processing on an image (raw data) obtained through the camera device and transmit the processed data to the electronic apparatus 100 through the communication interface 210.

Meanwhile, the processor 270 may perform the first processing through a second learning network model based on deep learning. For example, the second learning network model may learn and update a criterion for identifying which object is included in the image by using the image including the object as learning data. In addition, the second learning network model may learn and update a criterion for identifying various additional information around the object included in the image by using surrounding information included in the screen including the object as learning data. Accordingly, the second learning network model may identify and output an object included in the image obtained from the sensor device 200. In other words, the second learning network model may perform object detection processing (first processing). For example, cars, people, and traffic sings shown in FIG. 10 may be objects identified by the second learning network model.

However, when an error occurs in at least one of the processor 270 or the learning network model and the first processing cannot be performed, the processor 270 may transmit the obtained raw data to the electronic apparatus 100. Specifically, when a request to transmit raw data is received from the electronic apparatus 100, the processor 270 may transmit the raw data to the electronic apparatus 100. However, even if there is no request from the electronic apparatus 100, and if the processor 270 identifies that an error has occurred and the first processing cannot be performed, the raw data may be transmitted to the electronic apparatus 100.

Specifically, the processor 270 may periodically monitor transmission of the first processed data to identify whether an error occurs in the transmission of the first processed data.

Meanwhile, one processor 270 may control the overall operation of the camera device 230, the Lidar device 240, the Radar device 250, and the IR device 260, but each camera device 230, the Lidar device (240), the Radar device 250, and the IR device 260 may have a separate processor 270, respectively. In other words, the processor 270 may be implemented as a single chip to control a plurality of devices, or may be implemented as individual chips for each of the plurality of devices.

Meanwhile, in addition to the above-described devices, the sensor device 200 may further include a global positioning system (GPS) device, an inertial measurement unit (IMU), and an ultrasonic sensor.

The GPS device is configured to detect a geographic location of a vehicle, and the processor 270 may also acquire location information detected through the GPS device when acquiring a surrounding image.

The IMU may be a combination of sensors configured to detect changes in the vehicle's location and orientation based on inertial acceleration. For example, sensors may include accelerometers and gyroscopes.

The ultrasonic sensor is a component capable of identifying an object by using reflection of ultrasonic waves.

Figure 5:
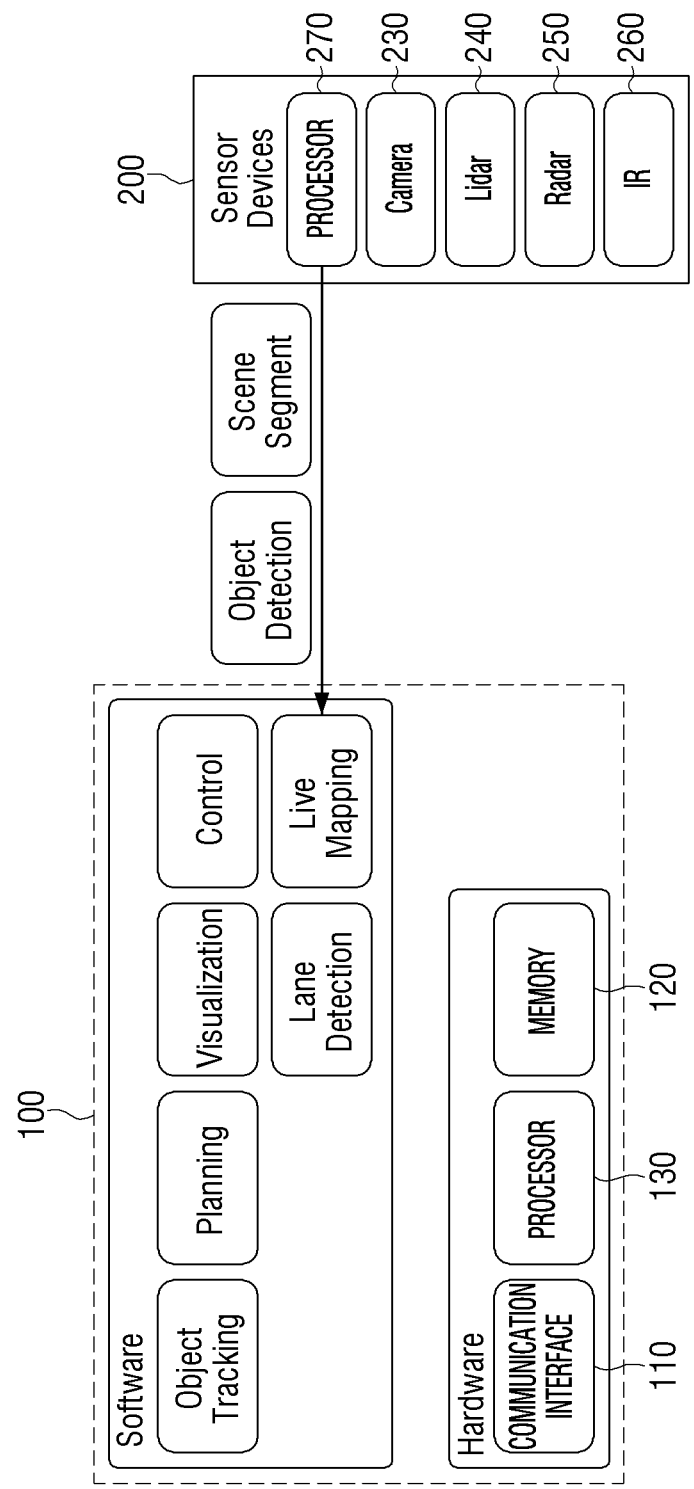
FIG. 5 is a view illustrating a case in which a sensor device according to an embodiment normally operates.

FIG. 5 is a view illustrating that a sensor device according to an embodiment of the disclosure normally operates.

Referring to FIG. 5, an object tracking function, a planning function, a visualization function, a control function, a lane detection function, a live mapping function, an object detection function and a scene segmentation function are required to perform an autonomous driving function Here, the object detection and the scene segmentation functions may be functions that may be processed and performed by the sensor device 200. Specifically, the processor 270 of the sensor device 200 may perform a first processing based on raw data obtained from at least one of the camera device 230, the Lidar device 240, the Radar device 250, or the IR device 260. Thereafter, the processor 270 may transmit the first processed data to the electronic apparatus 100. For example, as shown in FIG. 5, the processor 270 may transmit data processed by at least one of the object detection or the scene segmentation corresponding to the first processing data to the electronic apparatus 100.

The processor 130 of the electronic apparatus 100 may perform second processing the first processed data received from the sensor device 200 based on a first program stored in the memory 120. In other words, the processor 130 may perform at least one of the planning process, the live mapping process, the object tracking processing, the lane detection processing or the control processing by using data processed by at least one of the object detection and scene segmentation. For example, the processor 270 of the sensor device 200 may process object detection based on raw data to identify objects around the vehicle. The processor 130 of the electronic apparatus 100 may identify a lane among objects identified around the vehicle through lane detection processing, and may identify the location of the lane, the color of the lane, the type of the lane, or the like. In other words, the electronic apparatus 100 may perform the second processing to perform the autonomous driving function based on the first processed data from the sensor device 200. Since the first processing is performed by the sensor device 200, a computational burden on the electronic apparatus 100 may be reduced.

Meanwhile, in some cases, object tracking processing, lane detection processing, and visualization processing may be included in the first processing. However, planning processing, live mapping processing, and control processing are operations to be performed based on the first processed data, and the second processing must be performed by the processor 130.

Meanwhile, an embodiment in which an error occurs in the reception of data will be described in detail with reference to FIG. 6 below.

Figure 6:
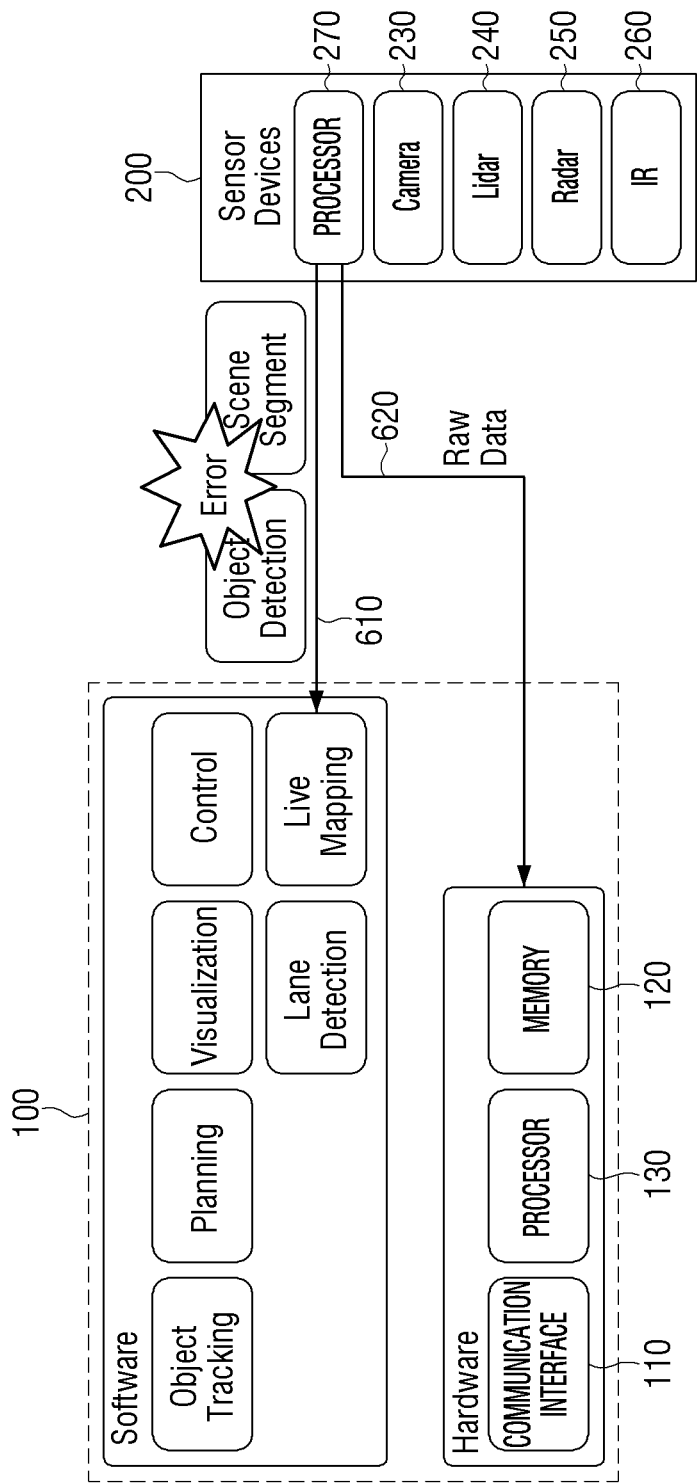
FIG. 6 is a view illustrating an occurrence of an error in the reception of data from a sensor device.

FIG. 6 is a view illustrating an error occurs in the reception of data from a sensor device according to an embodiment of the disclosure.

FIG. 6 assumes a case in which the electronic apparatus 100 is identified as having an error in receiving a first processed data. FIG. 6 may be a case in which an error occurs in receiving data processed by object detection processing and scene segmentation processing by the processor 270 of the sensor device 200 as an example. The error in the reception of data may include a case in which the electronic apparatus 100 fails to receive data or in which the electronic apparatus 100 receives data including an error.

When it is identified that the occurrence of an error in the reception of the first processed data through the communication interface 110 is identified, the processor 130 may request the sensor device 200 to transmit raw data. In this case, the processor 270 of the sensor device 200 may transmit the obtained raw data to the electronic apparatus 100. According to an embodiment, the first processed data may be received through a first communication channel 610, and raw data may be received through a second communication channel 620. The first communication channel 610 and the second communication channel 620 are different, but may be the same in some cases.

Meanwhile, when an error occurs in receiving the first processed data from some sensor devices, the electronic apparatus 100 normally receives the first processed data from the remaining sensor devices, and requests to transmit only raw data from some sensor devices in which the error occurs. For example, the first processed data of the raw data obtained from the Lidar device 240, the Radar device 250, and the IR device 260 is normally transmitted to the electronic apparatus 100, but it is assumed that an error occurs in receiving the first processed data of the raw data obtained from the camera device 230. In this case, the processor 130 may request the camera device 230 to transmit raw data, and may normally receive the first processed data of the raw data obtained from the remaining Lidar device 240, Radar device 250, IR device 260.

Figure 7:
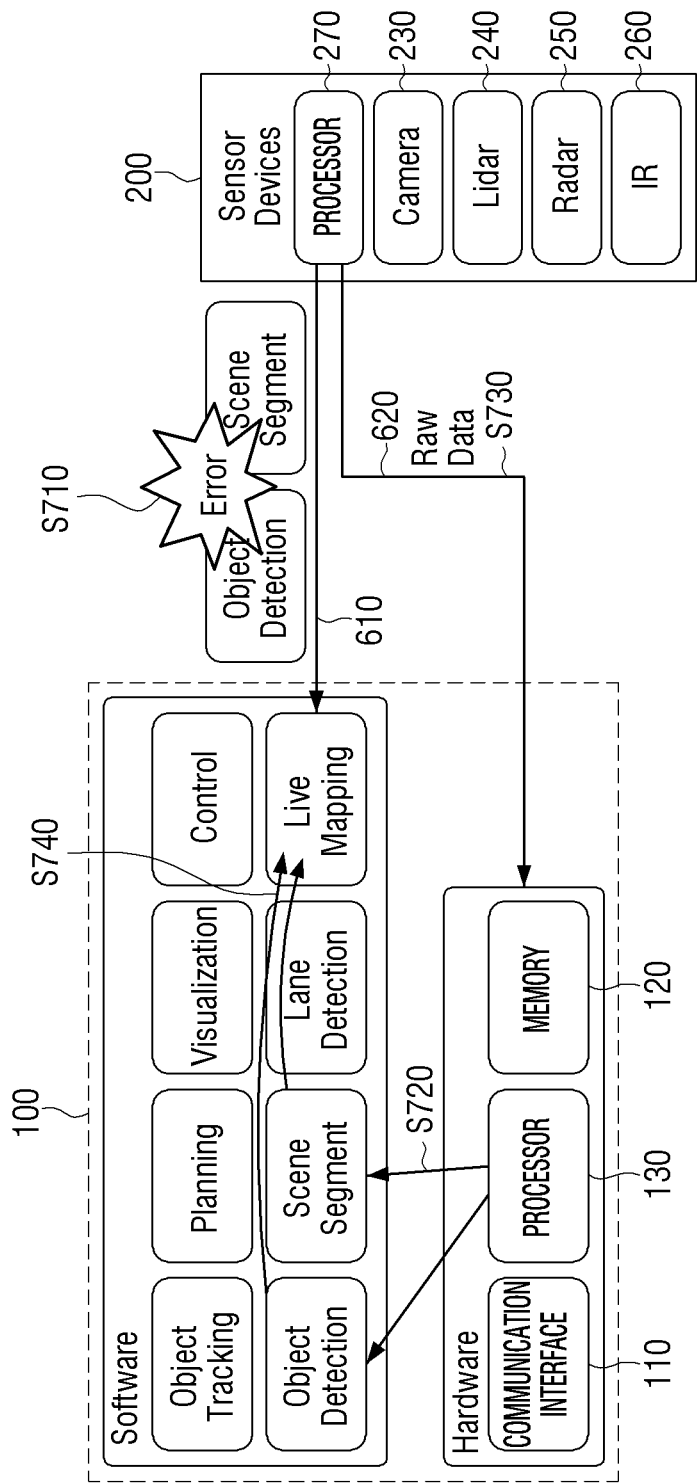
FIG. 7 is a view illustrating an operation of an electronic apparatus when an error occurs in data reception.

FIG. 7 is a view illustrating an operation of an electronic apparatus when an error occurs in data reception.

Referring to FIG. 7, the processor 130 may identify whether an error has occurred in data reception from the sensor device 200 (S710). Specifically, when the first processed data through the communication interface 110 is not received within a threshold time, the processor 130 may identify that an error has occurred in receiving the first processed data. Also, the processor 130 may periodically monitor reception of the first processed data to identify whether an error occurs in reception of the first processed data. Thereafter, if it is identified that an error has occurred in receiving the first processed data, the processor 130 may request the sensor device 200 to transmit raw data.

The processor 130 may load a second program stored in the memory 120 (S720). Specifically, the processor 130 may load the second program for performing object detection processing or scene segmentation processing based on raw data. The processor 130 may request the sensor device 200 to transmit raw data.

The processor 270 of the sensor device 200 may transmit raw data to the electronic apparatus 100 through the second communication channel 620 (S730). However, the operations of S720 and S730 may be changed.

The processor 130 may perform first processing the received raw data based on the loaded second program. For example, the processor 130 may perform object detection processing on the image (raw data) obtained from the camera device 230 based on the second program.

The processor 130 may load the first program stored in the memory 120 and perform the second processing the first processed data based on the loaded first program (S740). For example, the processor 130 may perform live mapping processing to display location and type information of objects around the vehicle according to a result of object detection processing based on the second program on a live map.

Figure 8:
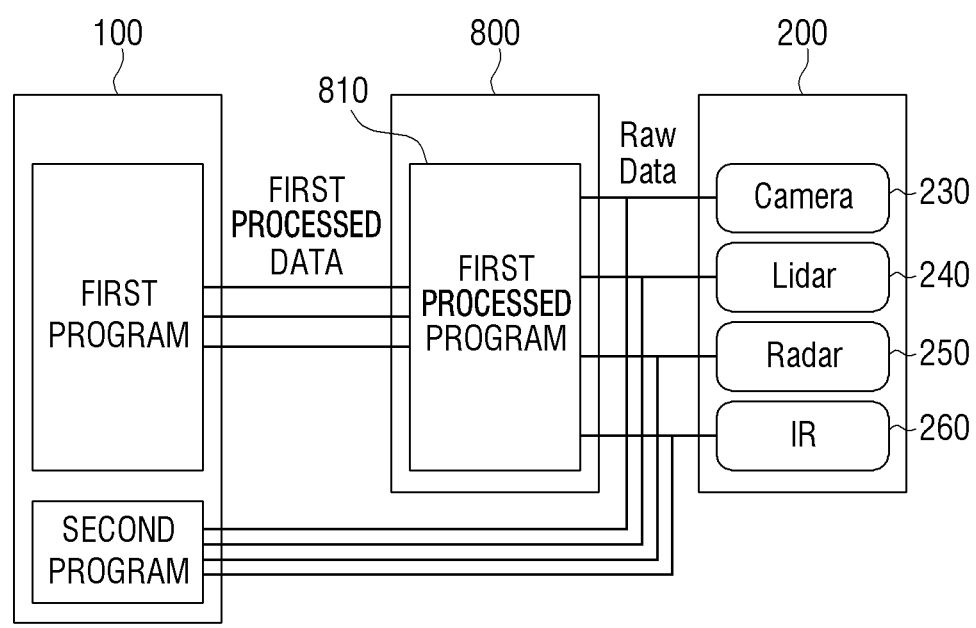
FIG. 8 is a view illustrating an embodiment in which a separate device for performing a first processing exists according to another embodiment.

FIG. 8 is a view illustrating an embodiment in which a separate device for performing a first processing exists according to another embodiment of the disclosure.

According to an embodiment, it has been described above that the sensor device 200 performs first processing raw data in a normal case, but according to another embodiment, a separate device 800 may perform the first processing the raw data obtained from the sensor device 200. Hereinafter, for convenience of description, a separate device is collectively referred to as the first processing device 800.

Referring to FIG. 8, the first processing device 800 may include a first processing processor 810 for performing first processing raw data obtained by the sensor device 200. The first processing processor 810 may perform first processing raw data received from at least one of the camera device 230, the Lidar device 240, the Radar device 250, and the IR device 260. The first processing processor 810 may transmit the first processed data to the electronic apparatus 100. In this case, the electronic apparatus 100 may perform second processing the first processed data based on the first program.

Meanwhile, when it is identified that there is the occurrence of an error in receiving the first processed data, the electronic apparatus 100 may request the sensor device 200 to transmit raw data. The sensor device 200 may transmit the obtained raw data to the electronic apparatus 100. In this case, the electronic apparatus 100 may perform the first processing the row data based on the row second program.

Figure 9:
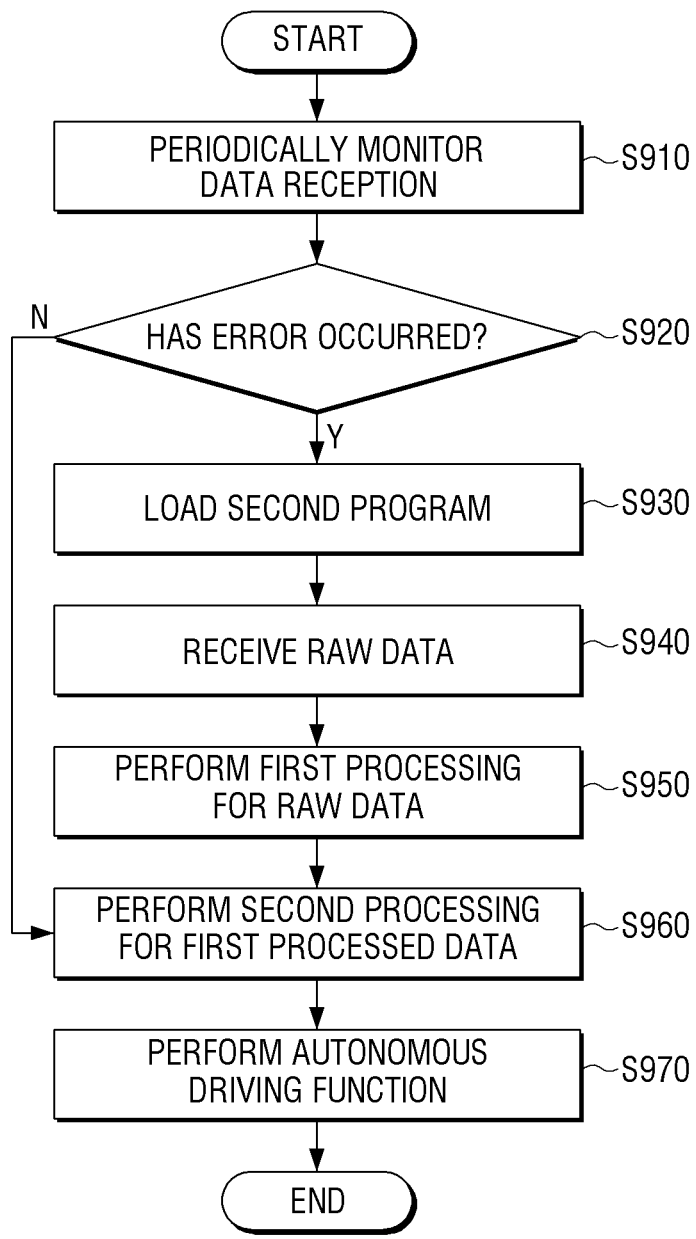
FIG. 9 is a view illustrating an operation of an electronic apparatus for performing an autonomous driving function according to an embodiment.

FIG. 9 is a view illustrating an operation of an electronic apparatus for performing an autonomous driving function according to an embodiment of the disclosure.

The electronic apparatus 100 may periodically monitor data reception (S910). Based on the monitoring, the electronic apparatus 100 may identify whether an error occurs in receiving the first processed data from the sensor device 200 (S920). For example, the electronic apparatus 100 may monitor whether or not the first processed data is received every 0.1 seconds, and if it is identified that the first processed data has not been received, it may identify that an error has occurred in the reception of the first processed data.

If it is identified that an error has occurred (S920—Y), the electronic apparatus 100 may load the stored second program (S930). Specifically, the electronic apparatus 100 may load a second program for performing object detection processing or scene segmentation processing based on raw data. The electronic apparatus 100 may request the sensor device 200 to transmit raw data.

The electronic apparatus 100 may receive raw data from the sensor device 200 (S940). When an error does not occur, the electronic apparatus 100 may receive the first processed data from the sensor device 200 through a first communication channel, and when an error occurs, the electronic apparatus 100 may receive the raw data 200 through a second communication channel from the sensor device. Here, the first communication channel and the second communication channel are different, but may be identical in some cases.

The electronic apparatus 100 may perform first processing on the received raw data based on the loaded second program (S950). For example, the electronic apparatus 100 may perform object detection processing on the image (raw data) obtained from the camera device 230 based on the second program. FIG. 10 illustrates first processed data according to an embodiment.

The electronic apparatus 100 may load the stored first program and perform second processing the first processed data based on the loaded first program (S960). For example, the processor 130 may perform live mapping processing to display location and type information of objects around the vehicle according to a result of object detection processing based on the second program on a live map.

The electronic apparatus 100 may perform an autonomous driving function based on the second processed data (S970). For example, the electronic apparatus 100 may control the steering of the vehicle based on the lane detection processing, and may control the speed of the vehicle by calculating a distance to an object based on the object detection processing.

Meanwhile, if it is identified that no error has occurred in receiving the first processed data (S920—N), the electronic apparatus 100 may receive the first processed data from the sensor device 200. The electronic apparatus 100 may perform second processing the first processed data (S960) and perform an autonomous driving function based on the second processed data (S970).

Figure 11:
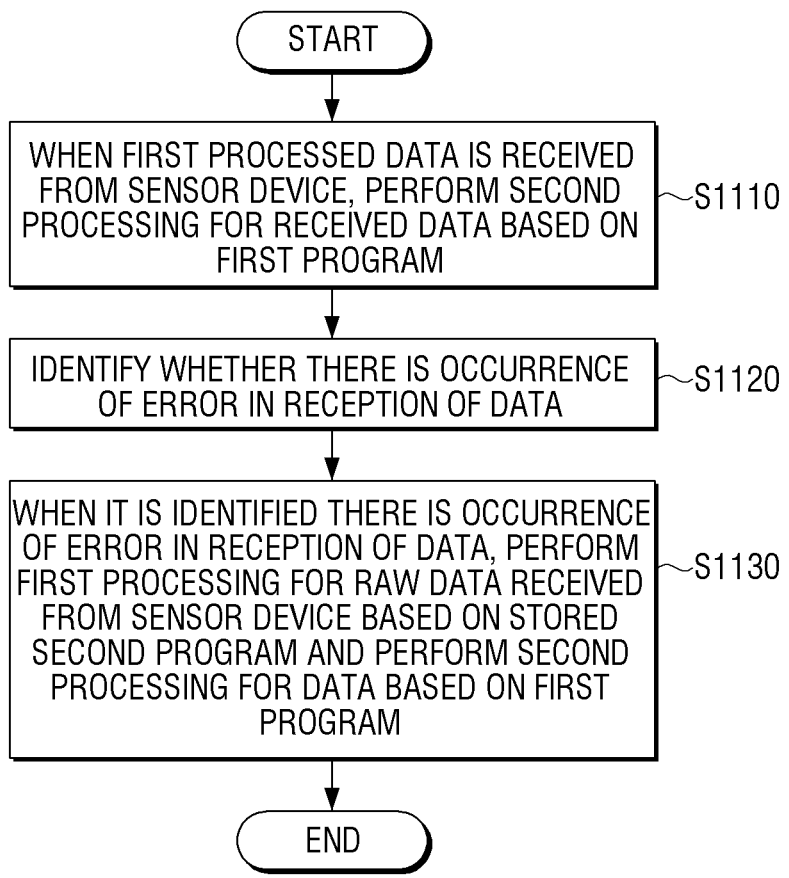
FIG. 11 is a flowchart illustrating a method of controlling an electronic apparatus according to an embodiment.

FIG. 11 is a flowchart illustrating a method for controlling an electronic apparatus according to an embodiment of the disclosure.

When the first processed data is received from the sensor device 200, the electronic apparatus 100 may perform second processing on the received data based on the stored first program (S1110). The sensor device 200 may include at least one of the camera device 230, the Lidar device 240, the Radar device 250, and the IR device 260. The first processing may include at least one of object detection and scene segmentation. For example, when the sensor device 200 is implemented as the camera device 230, the first processed data may be data obtained by processing at least one of object detection and scene segmentation in an image (raw data) acquired through the camera device 230.

Meanwhile, the second processing may include at least one of a planning processing, a live mapping processing, an object tracking processing, a lane detection processing, or a control processing for performing an autonomous driving function.

The electronic apparatus 100 may identify whether an error has occurred in data reception (S1120).

Specifically, when the first processed data is not received within a threshold time, the electronic apparatus 100 may identify that an error has occurred in receiving the first processed data. For example, when the threshold time is 0.1 seconds, and if the next processed data is not received within 0.1 seconds after receiving the first processed data, the electronic apparatus 100 may cause an error in receiving the first processed data.

Also, the electronic apparatus 100 may periodically monitor reception of the first processed data to identify whether an error occurs in reception of the first processed data. For example, the electronic apparatus 100 may monitor whether or not the first processed data is received every 0.1 seconds, and if it is identified that the first processed data has not been received, the apparatus may identify that there is the occurrence of data in the reception of the first processed data.

Meanwhile, when it is identified that there is the occurrence of error in receiving the first processed data, the electronic apparatus 100 may request the sensor device 200 to transmit raw data. However, even if there is no request for transmission from the electronic apparatus 100, the sensor device 200 may transmit the raw data to the electronic apparatus 100 when it is identified that an error has occurred in the first processing data transmission.

The first processed data may be received through a first communication channel, and raw data may be received through a second communication channel. The first communication channel and the second communication channel are different, but may be the same in some cases.

When it is identified that an error has occurred in receiving the data, the electronic device 100 may perform first processing for raw data received from the sensor device 200 based on a stored second program and may perform second processing for data based on a first program (S1130).

Since detailed operations of each operation have been described above, detailed descriptions will be omitted.

The methods according to the above-described example embodiments may be realized as software or applications that may be installed in the existing electronic apparatus.

Further, the methods according to the above-described example embodiments may be realized by upgrading the software or hardware of the existing electronic apparatus.

The above-described example embodiments may be executed through an embedded server in the electronic apparatus or through an external server outside the electronic apparatus.

According to an embodiment, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions. When the instructions are executed by a processor, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

In addition, according to an embodiment, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media such as a manufacturer's server, the application store's server, or a memory in a relay server.

Various exemplary embodiments described above may be embodied in a recording medium that may be read by a computer or a similar apparatus to the computer by using software, hardware, or a combination thereof. In some cases, the embodiments described herein may be implemented by the processor itself. In a software configuration, various embodiments described in the specification such as a procedure and a function may be embodied as separate software modules. The software modules may respectively perform one or more functions and operations described in the present specification.

According to various embodiments described above, computer instructions for performing processing operations of a device according to the various embodiments described above may be stored in a non-transitory computer-readable medium. The computer instructions stored in the non-transitory computer-readable medium may cause a particular device to perform processing operations on the device according to the various embodiments described above when executed by the processor of the particular device.

The non-transitory computer readable recording medium refers to a medium that stores data and that can be read by devices. For example, the non-transitory computer-readable medium may be CD, DVD, a hard disc, Blu-ray disc, USB, a memory card, ROM, or the like.

Further, each of the components (e.g., modules or programs) according to the various embodiments described above may be composed of a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program module, or other component, according to various exemplary embodiments, may be sequential, parallel, or both, executed iteratively or heuristically, or at least some operations may be performed in a different order, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
a communication interface;
a memory in which a program for performing an autonomous driving function is stored; and
a processor configured to, based on a first processed data that has been pre-processed for the autonomous driving function by an external sensor device being received from the external sensor device through the communication interface, perform post-processing for the autonomous driving function on the received data based on a first program stored in the memory,
based on the occurrence of an error in the reception of the data being identified, perform, based on a second program stored in the memory, pre-processing for the autonomous driving function on raw data received from the external sensor device, and then perform the post-processing on the processed raw data based on the first program, and
perform autonomous driving function based on the post-processing.

2. The electronic apparatus of claim 1, wherein the external sensor device is a camera device, and wherein the first processed data has been pre-processed by at least one of object detection and scene segmentation in an image acquired through the camera device.

3. The electronic apparatus of claim 2, wherein the post-processing is configured to include post-processing using data received from a plurality of external devices including the external sensor device.

4. The electronic apparatus of claim 2, wherein the post-processing is configured to include at least one of planning processing, live mapping processing, object tracking processing, lane detection processing or control processing, for performing the autonomous driving function.

5. The electronic apparatus of claim 1, wherein the processor is configured to, based on the first processed data being not received within a threshold time through the communication interface, identify there is the occurrence of an error in the reception of the first processed data.

6. The electronic apparatus of claim 1, wherein the processor is configured to identify whether an error occurs in the reception of the first processed data by periodically monitoring the reception of the first processed data.

7. The electronic apparatus of claim 1, wherein the processor is configured to, based on the occurrence of an error in the reception of the first processed data being identified through the communication interface, request a transmission of the raw data from the external sensor device.

8. The electronic apparatus of claim 1, wherein the external sensor device is configured to include at least one of a camera device, a light detection and ranging (Lidar) device, a radio detection and ranging (Radar) device or an infra-red (IR) device.

9. The electronic apparatus of claim 1, wherein the first processed data is configured to be received through a first communication channel, and wherein the raw data is configured to be received through a second communication channel.

10. The electronic apparatus of claim 1, wherein the processor is configured to, based on the occurrence of an error in the reception of the first processed data being identified, perform the first processing for the raw data by loading the second program stored in the memory.

11. A method for controlling an electronic apparatus in which a program for performing an autonomous driving function is stored, the method comprising:
based on a first processed data that has been pre-processed for the autonomous driving function by an external sensor device being received from the external sensor device, performing post-processing for the autonomous driving function on the received data based on a stored first program;
identifying the occurrence of an error in the reception of the data;
based on the occurrence of the error in the reception of the data being identified, performing, based on a stored second program, pre-processing for the autonomous driving function on raw data received from the external sensor device, and then performing the post-processing on the processed raw data based on the first program, and performing autonomous driving function based on the post-processing.

12. The method of claim 11, wherein the external sensor device is a camera device, and
wherein the first processed data is data processed by at least one of object detection and scene segmentation in an image acquired through the camera device.

13. The method of claim 12, wherein the post-processing is configured to include a processing using data received from a plurality of external devices including the external sensor device.

14. The method of claim 12, wherein the post-processing is configured to include at least one of planning processing, live mapping processing, object tracking processing, lane detection processing or control processing, for performing the autonomous driving function.

15. The method of claim 11, wherein the identifying the occurrence of the error includes, based on the first processed data being not received within a threshold time through the communication interface, identifying there is the occurrence of the error in the reception of the first processed data.

16. An electronic apparatus comprising:
a communication interface;
a memory in which a program for performing an autonomous driving function is stored; and
a processor configured to, based on a first processed data that has been pre-processed for the autonomous driving function by an external sensor device being received from the external sensor device through the communication interface, execute a first program stored in the memory to perform post-processing for the autonomous driving function on the received data,
based on the occurrence of an error in the reception of the data being identified, execute a second program stored in the memory to perform pre-processing for the autonomous driving function on raw data received from the external sensor device, and then execute the first program to perform the post-processing on the processed raw data, and
perform autonomous driving function based on the post-processing.

17. The apparatus of claim 16, wherein the external sensor device is a camera device, and
wherein the first processed data has been pre-processed by at least one of object detection and scene segmentation in an image acquired through the camera device.

18. The apparatus of claim 17, wherein the post-processing is configured to include post-processing using data received from a plurality of external devices including the external sensor device.

19. The apparatus of claim 17, wherein the post-processing is configured to include at least one of planning processing, live mapping processing, object tracking processing, lane detection processing or control processing, for performing the autonomous driving function.

* * * * *